Jan. 15, 1952   A. B. BRUSSE   2,582,230
ORTHODONTIC BRACKET
Filed June 30, 1949
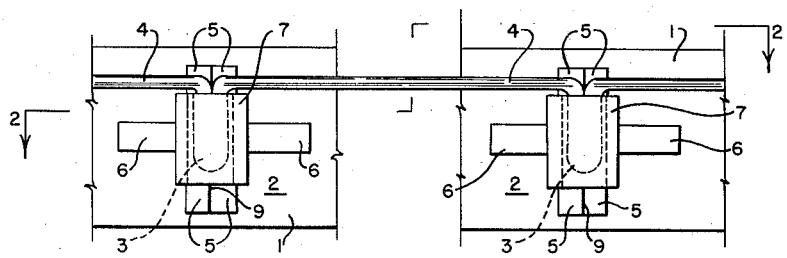
FIG.—1
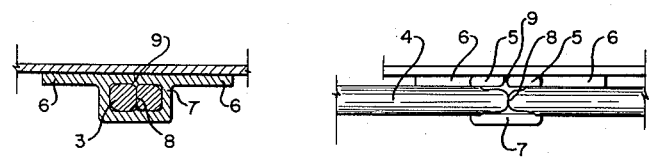
FIG.—2
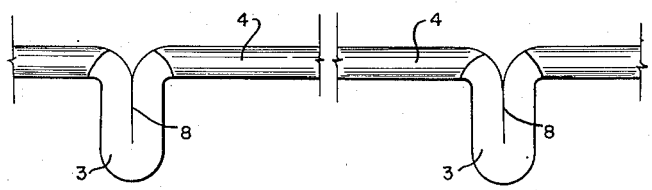
FIG.—3
INVENTOR.
Archie B. Brusse
BY
ATTORNEY Patented Jan. 15, 1952

2,582,230

UNITED STATES PATENT OFFICE 2,582,230

ORTHODONTIC BRACKET

Archie B. Brusse, Denver, Colo., assignor to Rocky Mountain Metal Products Co., Denver, Colo., a corporation of Colorado Application June 30, 1949, Serial No. 102,377

5 Claims. (Cl. 32—14)

The present invention relates to an orthodontic bracket. The present application is a continuation-in-part of my co-pending applications, Serial Nos. 588,491 and 695,596, now Patent Numbers 2,524,763 and 2,495,692, respectively.

One of the objects of the present invention is to provide an improved bracket for orthodontic use.

A further object of the present invention is to provide an improved orthodontic bracket having a hollow tube or socket capable of receiving and supporting an arch wire which is flattened on itself and which substantially fills the hollow tube or socket of the bracket.

A further object of the present invention is to provide an orthodontic bracket having a tube or socket, one wall of which has a flat exterior surface adapted to lie flat against a toothband, and a plurality of welding flanges which extend outwardly from the wall and provide means for attaching the bracket to the toothband.

Another object of the present invention is to provide an improved bracket structure like that referred to in the preceding paragraph, in which the welding flanges and the wall of the tube extend generally in the same plane.

The foregoing and other objects and advantages of the present invention will appear from the following description and appended claims when considered in connection with the accompanying drawing. In said drawing:

Fig. 1 is an elevational view of one form of bracket embodying the present invention and showing a pair of such brackets secured to toothbands and connected by an arch wire.

Fig. 2 is an enlarged view taken substantially along the line 2—2 of Fig. 1; and Fig. 3 is an enlarged view of the arch wire shown in Fig. 1.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now to the drawing, Fig. 1 illustrates two toothbands 1 to each of which is secured a bracket 2 for anchoring projections 3 on a round arch wire 4. The arch wire is employed in accordance with orthodontic practice to apply pressure in a desired direction between the two teeth to which the bands 1 are attached. The brackets 2 are provided with vertical and horizontal flanges 5 and 6, respectively, which are welded or otherwise suitably bonded to the bands 1. The bodies of the brackets comprise vertically extending tubes 7 providing receiving passages for the projections 3. It will be understood, of course, that the brackets may be secured to the toothbands in any positions required by the particular application being made, the vertical positions being indicated here for purposes of illustration.

It is desirable that the arch wire 4 be connected to the brackets 2 in such a manner that force may be exerted in any desired direction between the wire and the brackets without any substantial relative movement between the brackets and the wire. The required adjustment of the arch is greatly facilitated by the arrangement of the projections 3 so that they cannot rock in the tubes 7. As shown clearly in Fig. 2, each of the tubes 7 is of oblong or substantially rectangular cross section and the projections 3 fit tightly therein, their cross sections being substantially the same as that of the tubes. The projections engage the tubes on all four sides and are formed with flat faces on the broader sides so that they have face contact with the sides of the tubes. Furthermore, each projection is formed as a doubled or flattened loop of the wire as shown in Fig. 3 and adjacent inner sides of the loop are flattened and in face engagement as indicated at 8 in Figs. 2 and 3. This insures minimum rocking or twisting of either loop portion in the tube. The lower ends of the projections, comprising the return bends of the wire loops, are of rounded form so that they facilitate the insertion of the projections in the tubes and the engagement of the tubes and projections to provide a tight frictional fit. Figs. 2 and 3 show clearly how the round cross section of the wire 4 is flattened between the two sides of each of the loops and on the broader sides of the projections.

It is to be noted that the wall of the hollow tube or socket 7 from which the flanges 5 and 6 project or extend outwardly, is slotted throughout its length, as indicated at 9 in Figs. 1 and 2, in a direction substantially parallel to the axis of the tube 7 to enable the tube to resiliently grip the anchoring projection 3 of the arch wire which has been flattened on itself. By so sloting the wall, expansion and contraction of the tube is allowed for, thus enabling the tube to resiliently grip the arch wire projecting portion when it is inserted therein. It is to be noted further, particularly with reference to Fig. 2, that the space within the hollow tube or socket 7 is substantially filled by the projecting portion 3 of the arch wire which, as stated above, has been flattened on itself.

The so-called welding flanges 5 and 6 preferably extend generally in the plane of the slotted wall of tube 7 which tube, as seen in Fig. 2, is of substantially rectangular shape both externally and internally. This internal shape, along with the flattened portions of the arch wire minimizes any tendency of the arch wire within the tube to rock or twist.

Having thus described the invention, what is claimed is:

1. On orthodontic bracket comprising a hollow tube having flat inner surfaces forming a substantially rectangular inner passage, said tube comprising a wall having a flat exterior surface adapted to lie flat against a toothband, said wall being virtually solid except for a narrow slot extending throughout its length in a direction parallel to the axis of the tube to allow for expansion and contraction of the tube to enable the tube to resiliently grip an arch wire inserted therein, a pair of welding flanges each extending outwardly from an opposite edge of said slotted wall and in a direction perpendicular to the axis of the tube, a second pair of welding flanges extending from said slotted wall at one end thereof and in a direction parallel to the axis of the tube, and a third pair of welding flanges extending from said slotted wall at the other end thereof and in a direction parallel to the axis of the tube, said slotted wall and flanges all lying in substantially the same plane.

2. An orthodontic bracket comprising a hollow tube having flat inner surfaces forming a substantially rectangular inner passage, said tube comprising a wall having a flat exterior surface adapted to lie flat against a toothband, said wall being slotted substantially centrally thereof throughout its lentgh in a direction parallel to the axis of the tube to allow for expansion and contraction of the tube to enable the tube to resiliently grip an arch wire inserted therein, a pair of welding flanges each extending outwardly from an opposite edge of said wall and in a direction perpendicular to the axis of the tube, and a plurality of other welding flanges extending from said wall at opposite ends thereof and in a direction parallel to the axis of the tube, said wall and flanges all lying in substantially the same plane.

3. An orthodontic bracket comprising a hollow expansible and contractible tube having relatively flat inner surfaces forming a substantially rectangular inner passage, said tube comprising a wall having a flat exterior surface adapted to lie flat against a toothband and providing means for receiving and resiliently supporting an arch wire inserted therein, said arch wire substantially filling the tube, and welding flanges extending outwardly from the side edges and the top and bottom edges of said wall, all of said welding flanges being disposed normally in substantially the same plane as said wall.

4. An orthodontic bracket comprising a hollow tube having relatively flat inner surfaces forming a substantially rectangular inner passage, said tube comprising four walls including a wall having a flat exterior surface adapted to lie flat against a toothband and providing means for receiving and supporting an arch wire inserted therein, said arch wire substantially filling the tube, and a series of welding flanges extending outwardly from the several edges of said wall, certain of said flanges extending in a direction generally parallel to the axis of the tube, the other of said flanges extending in a direction generally perpendicular to the axis of said tube, and all of said flanges extending in substantially the same plane as said wall.

5. An orthodontic bracket according to claim 4, wherein the hollow tube is of an expansible and contractible nature, and wherein it receives and resiliently supports an arch wire.

ARCHIE B. BRUSSE.

REFERENCES CITED

The following references are of record in the file of this patent:

UNITED STATES PATENTS

| Number | Name | Date |
| --- | --- | --- |
| 2,125,587 | Richardson | Aug. 2, 1938 |
| 2,196,515 | Atkinson | Apr. 9, 1940 |
| 2,257,069 | Peak | Sept. 23, 1941 |